Aug. 28, 1923.
E. A. RIX
1,466,482
LIQUID DISPENSING AND MEASURING DEVICE
Filed Oct. 27, 1920     2 Sheets-Sheet 1
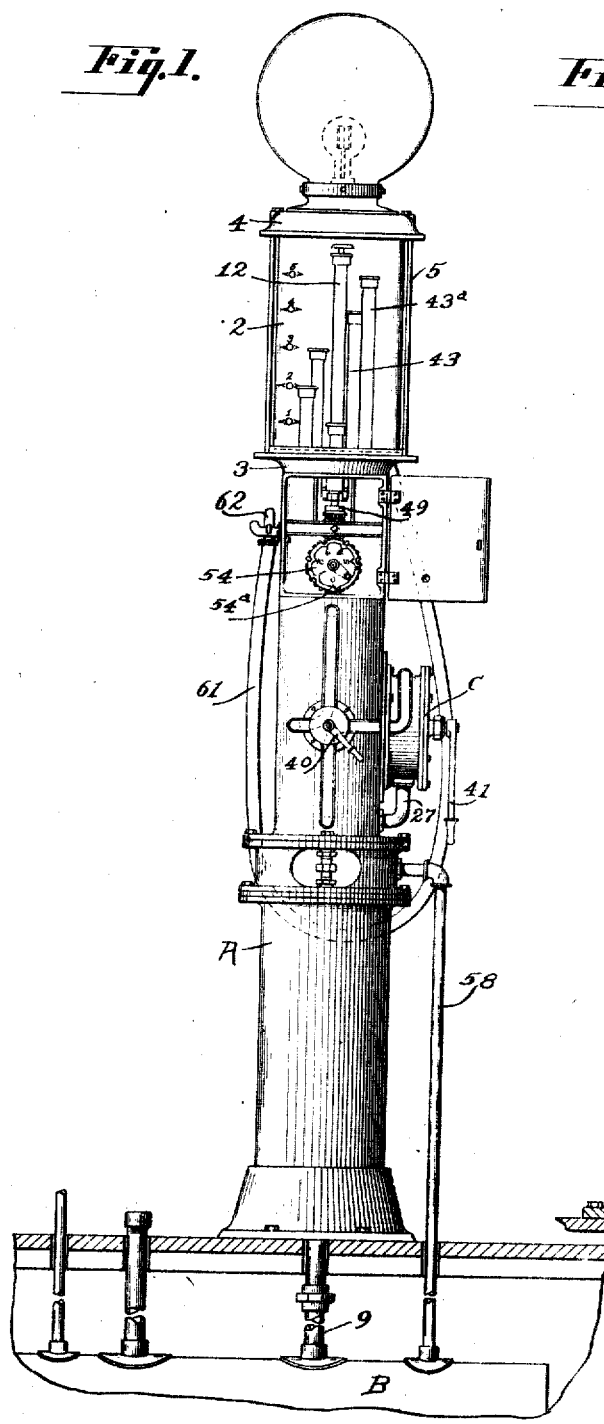
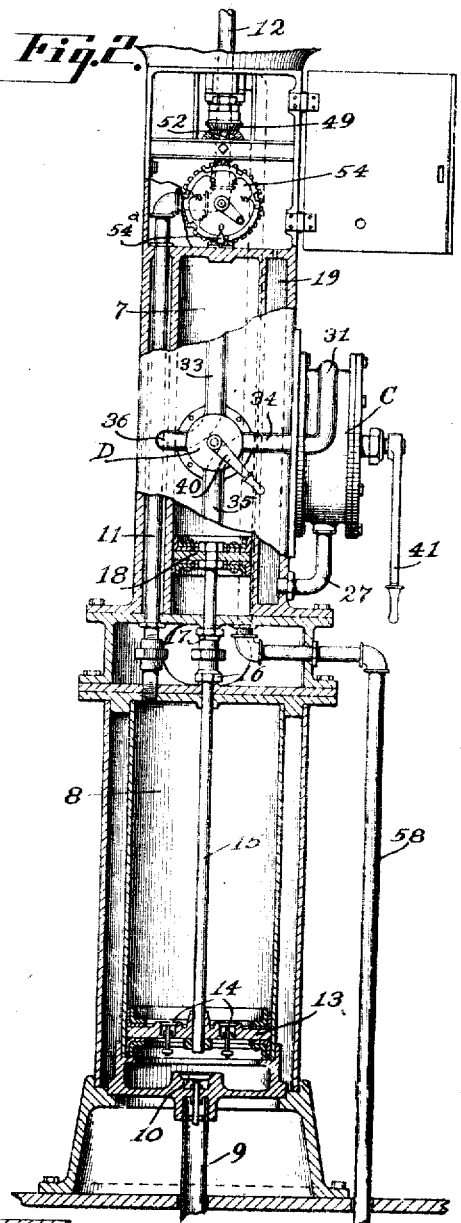
INVENTOR.
Edward A. Rix.
BY Chas. E. Townsend
ATTORNEY.

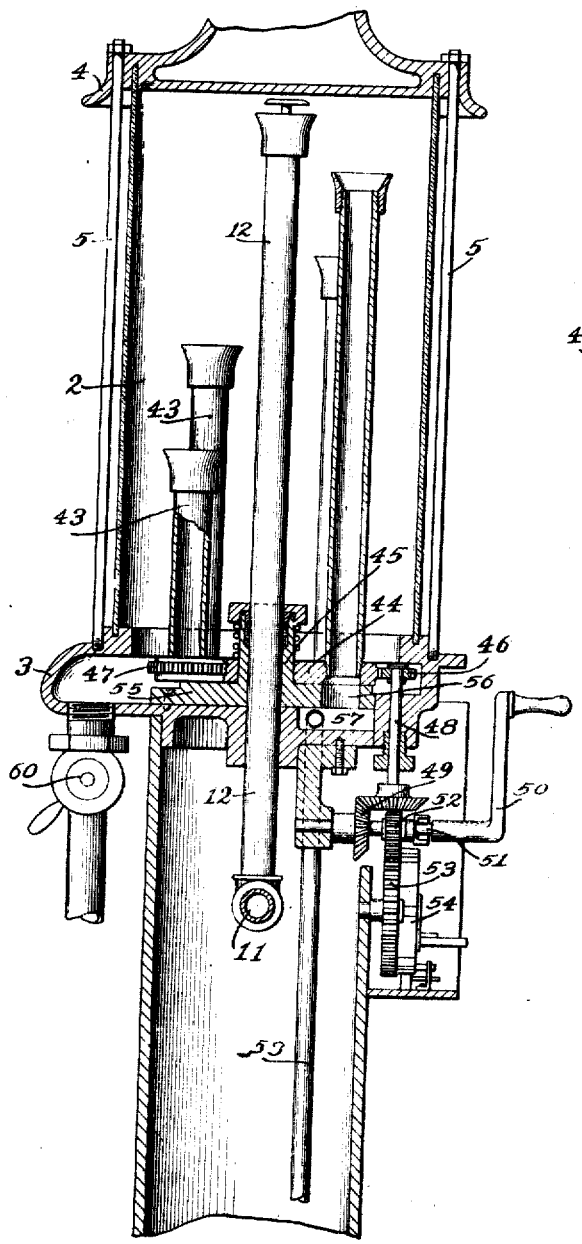

Patented Aug. 28, 1923.

1,466,482

UNITED STATES PATENT OFFICE.

EDWARD A. RIX, OF SAN FRANCISCO, CALIFORNIA.

LIQUID DISPENSING AND MEASURING DEVICE.

Application filed October 27, 1920. Serial No. 419,916.

*To all whom it may concern:*

Be it known that I, EDWARD A. RIX, a citizen of the United States, residing at the city and county of San Francisco, and State of California, have invented new and useful Improvements in Liquid Dispensing and Measuring Devices, of which the following is a specification.

This invention relates to a liquid dispensing and measuring device, and especially to that type employed by garages, automobile service stations, etc., where gasoline and like volatile liquids are sold.

One of the objects of the present invention is to provide a device or apparatus of the character described employing an enclosed transparent measuring tank permitting visible display of a measured quantity of liquid to be sold, and particularly to provide novel means for delivering the liquid to be measured and dispensed from a suitable source of supply, and for returning to said source any excess liquid delivered and vapors that may form.

Another object of the invention is to provide an overflow or return connection between the measuring tank and the source of supply which forms a constant open duct between the same, said duct remaining open regardless of whether or not the apparatus is being operated.

Another object of the invention is to provide a novel pumping unit whereby the liquid is transferred from the reservoir to the measuring tank, said unit being capable of manual operation or of being operated by a liquid or fluid under pressure, and said unit being so proportioned that its total delivery will be less than the capacity of the measuring tank, thereby preventing pressure formation or overcharging of the transparent measuring tank.

Further objects will hereinafter appear.

The invention consists of the parts and the construction, combination and arrangement of parts as hereinafter more fully described and claimed, having reference to the accompanying drawings in which—

Fig. 1 is a side elevation of the liquid dispensing and measuring device.

Fig. 2 is an enlarged detail view in section showing the arrangement of the pumping unit.

Fig. 3 is an enlarged detail section of the measuring tank, and the measuring device contained.

Fig. 4 is an enlarged detail view of the hand pump.

Fig. 5 is an enlarged detail sectional view of the controlling valve.

Referring to the drawings in detail, A indicates a standard or column on the upper end of which is supported a measuring tank 2. This tank is cylindrical in cross section and is constructed of glass, said glass being secured between a pair of head members 3 and 4, which are grooved to receive the cylinder and which are drawn together by tie rods as indicated at 5. The standard or column A encloses a pair of cylinders 7 and 8. The cylinder 8 communicates with a storage tank or reservoir B by means of a suction pipe 9 on the upper end of which is mounted a check valve 10. The cylinder further communicates with the measuring tank by means of a connecting pipe 11; said pipe being connected with a stationary centrally disposed supply pipe 12, which enters the measuring tank. The cylinder 8 is otherwise provided with a piston 13 of suitable construction, on which is mounted a pair of check valves 14, said valves being opposed in action to the check 10. The piston 13 is secured to a piston rod 15 which passes through a stuffing box 16 formed on the upper end of the cylinder. This rod passes through a second stuffing box 17 and then enters the upper cylinder 7 where it is secured to a hydraulic ram or piston 18.

Formed exterior of the cylinder 7 is an annular jacket chamber 19, and supported exterior of the jacket chamber is a hand pump C. This pump consists of a cylinder 20 (see Fig. 4) through which extends a shaft 21. Secured on the shaft within the cylinder is an oscillating vane piston 22, on which is secured a pair of check valves 23. Mounted below the shaft is a stationary partition member 24 on which is mounted a pair of check valves 25. Formed below the partition member is an inlet chamber 26 which communicates with the jacket space 19 by means of a suction pipe 27. The partition member 24, together with the oscillating piston vane 22 divides the cylinder proper into four independent chambers, to-wit, an inlet chamber 26, a pair of suction chambers 28 and 29, and a discharge chamber 30, which communicates with a controlling valve D by means of a discharge pipe 31. The type of pump shown does not form any vital part of the present invention as any other suitable form of hand operated pump or even power driven pump might be employed, but as the particular pump shown is employed, illustration and description thereof is submitted.

The controlling valve D is of the 4-way type as illustrated in Figs. 2 and 5. It consists of a casing 32 in which is formed four connections, 33, 34, 35 and 36. Turnably mounted within the casing is a valve proper as indicated at 37; this valve having a pair of passages 38 and 39 formed therein which are adapted to communicate with the several connections 33, 34, 35 and 36; the valve proper being turned by means of a handle extension 40.

The passage 34 is connected with the discharge pipe 31 of the pump C. The passage 36 connects with the jacket chamber 19 while the passages 33 and 35 communicate with the opposite ends of the cylinder 7 as shown. The jacket chamber 19, the cylinder 7 and the pump C is filled with oil and if it is desired to operate the ram 18 and the connected piston 13, it is only necessary to transmit an oscillating movement to the pump C by means of a lever 41. Oscillating movement transmitted to the piston vane 22 of the pump C will cause the check valves 25 to alternately open and similarly the check valves 23. The oil is in this manner taken from the jacket space 19 and is transferred by the pump through the discharge pipe 31 to the controlling valve D. If this assumes the position shown in Fig. 5, it will be obvious that the oil under pressure discharged through the pipe 31 will enter the connection 34 and will pass through the passage 39 in the valve which communicates with the connection 35. This connection delivers oil under pressure to the lower end of the cylinder 7 where it will exert its pressure on the ram 18 and force this, together with the piston 13 in an upward direction. Oil contained in the upper part of the cylinder 7 will at the same time discharge through the connection 33 and will pass through the passage 38 in the valve and the connection 36 which returns it to the jacket space 19. In other words oil removed from the jacket during the operation of the pump C is constantly returned through the connection 36, thereby neither increasing or diminishing the supply contained therein. The upward movement imparted to the ram 18 and the connected piston 13 will produce a suction in the lower end of the cylinder 8. The check valve 10 will therefore open and liquid will be elevated through the connection 9, thus filling the cylinder 8. Liquid previously delivered thereto will at the same time be forced through the pipe 11 and the connected pipe 12 and is thus delivered to the measuring tank 2. This is of course due to the fact that the check valves 14 automatically close during the upward stroke of the piston 13. These valves open during the downward stroke and check 10 conversely closes, thus transferring the liquid from one side of the piston to the other; reverse movement being transmitted to the ram and the piston by changing the position of the valve D.

It often happens that varying quantities, for instance, of gasoline is sold. One buyer may only require a gallon; another two or three gallons, and so on. The present apparatus is designed so that its maximum delivery at one time is five gallons. Either 1, 2, 3, 4 or 5 gallons however may be dispensed or sold as desired. To measure the gasoline or liquid dispensed I provide a measuring device consisting of a plurality of tubes, such as indicated at 43. These tubes are supported by a revolving head member 44 which is turnably mounted on a central boss 45. The head 44 is in this instance provided with five openings equally interspaced and radially arranged. The openings extend entirely through the head and are threaded to receive the measuring pipes 43. The head is adapted to be manually rotated by a pinion 46 which intermeshes with a gear 47 formed on the exterior periphery of the head 44. The gear 46 is secured on a shaft 48 and is rotated through a bevel gear train 49 by means of a hand crank 50. The hand crank is carried by a shaft 51 which in turn supports a spur pinion 52 intermeshing with a spur gear 53. The spur gear 53 carries an indicating dial 54 on its forward face and is merely provided for the purpose of indicating the position of the measuring tubes 43. The rotating head member 44 is turnably mounted on the central boss 45 as previously described. The boss 45 is formed as an integral part of a plate 55. This plate supports the rotating head 44 and it has a discharge opening 56 formed therein with which any one of the measuring pipes may register. The discharge opening 56 communicates with a chamber 57 and this in turn communicates with the storage tank or supply reservoir B by means of a pipe 58.

In actual operation we will suppose that a call is made for four gallons of gasoline. If this is the case the operator in charge will first turn the crank 50 until the numeral 4 on the indicating dial registers with the pointer 54ⁿ. This registration indicates to the operator that the measuring pipe indicated at 43ª is in register with the overflow or discharge opening 56, and it further means that if more than four gallons are delivered by the pump unit to the measuring tank that an overflow will take place through the pipe 45ª, and that it will be impossible to retain more than four gallons in the measuring tank. This is however the quantity of gasoline required and is therefore a desirable feature. The operator will next grasp the lever 41 of the pump C and rock the same. This rocking movement causes oscillation of the piston vane 22 and oil will thus be transferred from the jacket space 19 and delivered to the cylinder 7 where it will force the ram in an upward direction, thereby elevating the piston 13 and the gasoline contained in the cylinder 8; the gasoline elevated being transferred through the pipe 11 and the central delivering pipe 12 and finally entering the measuring tank, which it gradually fills until it overflows through the pipe 13ᵃ. As the cylinder 2 is transparent the operator either turns valve D or stops pumping the moment he sees that the gasoline is beginning to overflow. If he is mistaken to the extent that the quantity delivered is not quite sufficient, it is obvious that an additional stroke or two of the pump lever 41 will complete the filling, and he then merely waits a few seconds until the liquid level is settled as this shows that all liquid in excess of four gallons has been returned to the reservoir. He now merely opens a discharge valve 60 to which is connected a rubber hose 61 and a nozzle 62 of the usual construction; said hose and nozzle being particularly convenient when filling tanks of automobiles, etc.

The present invention embodies several important features, among which will first be mentioned the return or overflow pipe 58. This pipe forms a connection or conduit between the measuring tank and the supply reservoir which is open at all times. The pipe or conduit serves several functions; that of an overflow pipe by which excess liquid is returned; that of a venting pipe, and also that of a duct for the escape of vapors which may be formed within the measuring tank. The return of vapors to the source of supply is of course an exceedingly important feature as it obviates the danger which might occur if they were discharged into the atmosphere or otherwise permitted to escape. Any one of the measuring pipes 43 may be turned into register with the overflow pipe and it may therefore be stated that an open or a return connection is at all times provided. This is exceedingly important as it will thus be impossible to burst the glass measuring tank, that is gases or liquid entering from the pump cylinder which may be in excess of the quantity required will naturally be relieved and returned through the vent.

The second important feature is the provision of a pump which is interposed between the reservoir and the measuring tank, said pump being capable of elevating the gasoline, particularly when the reservoir is placed under ground. The pump embodies another important feature, that is its total capacity during one stroke is considerably less than the receiving capacity of the measuring tank. Overcharging of the measuring tank is thus avoided and similarly any excess back pressure if for instance the overflow pipe should become clogged or otherwise temporarily closed.

Another important feature of the invention is the provision of a ram which is so connected with the gasoline pump that the pump may be actuated thereby. The ram is in this instance shown as operated by a hand pump as indicated at C, but it should be obvious that it might be operated by any fluid or liquid under pressure, for instance, within city limits where water under pressure is conveniently obtained, it would only be necessary to connect the water main with the connection 34. Turning movement of the valve to the right position will thus admit the water under pressure to one end or another of the ram cylinder. The water discharging from the opposite end of the ram cylinder would in this instance also enter the jacket chamber 19, and it may be removed from this chamber by a suitable pipe connection which would drain the same and direct the flow to a sewer or otherwise.

The particular form of measuring device employed in this instance, to-wit, the measuring pipes 43, the rotating head supporting the same, and the gear mechanism whereby movement is transmitted to rotate the head, are all features which are covered and shown in my copending application, entitled, "Liquid measuring and dispensing device", filed July 28, 1920, Serial No. 399,499. They therefore form no particular part of the present invention, except that they show a means for varying and determining the liquid level in the measuring tank. Any other measuring device might of course be employed, and while certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. In a device of the character described a container having a measuring chamber formed therein, a source of liquid supply, a delivery pipe forming a connection between the source of supply and the measuring chamber, means for transferring liquid from the source of supply through said pipe to the measuring chamber, a rotor mounted within the chamber, a series of open ended pipes carried by the rotor and each pipe terminating at a different height, a central pipe about which the rotor rotates, said pipe forming a venting connection between the measuring chamber and the source of supply, and means for turning the rotor to bring any one of the pipes of varying height into register with the delivery pipe.

2. In a device of the character described, a container having a measuring chamber formed therein, a delivery pipe forming a connection between said measuring chamber and a source of supply, means for transferring liquid from the source of supply through said pipe to the measuring chamber, a rotor mounted within the chamber, a series of open-ended pipes carried by the rotor and which pipes terminate at a different height, a venting pipe, said pipe forming a connection between the measuring chamber and the source of supply, and means for turning the rotor to bring any one of the pipes of varying height into register with the delivery pipe.

EDWARD A. RIX.